United States Patent
Iyer et al.

(10) Patent No.: US 12,340,006 B2
(45) Date of Patent: Jun. 24, 2025

(54) SELECTIVE DISPLAY INFORMATION SECURITY SYSTEM

(71) Applicant: Dell Products L.P., Round Rock, TX (US)

(72) Inventors: Hariprasad J. Iyer, Round Rock, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 266 days.

(21) Appl. No.: 17/589,243

(22) Filed: Jan. 31, 2022

(65) Prior Publication Data

US 2023/0244823 A1 Aug. 3, 2023

(51) Int. Cl.
*G06F 21/84* (2013.01)
*G06F 21/32* (2013.01)
*G06F 21/62* (2013.01)

(52) U.S. Cl.
CPC .............. *G06F 21/84* (2013.01); *G06F 21/32* (2013.01); *G06F 21/6245* (2013.01)

(58) Field of Classification Search
CPC ...... G06F 21/84; G06F 21/32; G06F 21/6245; G06F 2221/032
See application file for complete search history.

(56) References Cited

U.S. PATENT DOCUMENTS

| | | | |
|---|---|---|---|
| 10,928,899 B2 | 2/2021 | Krishnakumar et al. | |
| 11,042,649 B1* | 6/2021 | John | G06F 21/84 |
| 11,227,060 B1* | 1/2022 | John | G06F 21/84 |
| 2009/0141895 A1* | 6/2009 | Anderson | G06F 21/84 380/252 |
| 2010/0205667 A1* | 8/2010 | Anderson | G06F 21/84 726/19 |

(Continued)

FOREIGN PATENT DOCUMENTS

| | | | | |
|---|---|---|---|---|
| CN | 104715213 A * | 6/2015 | | G06F 21/84 |
| FR | 2978267 A1 * | 1/2013 | | G06F 21/84 |
| WO | WO-2015094310 A1 * | 6/2015 | | G06F 21/50 |

OTHER PUBLICATIONS

English translation of FR-2978267-A1, retrieved from PE2E search, 8 pages. (Year: 2015).*

(Continued)

*Primary Examiner* — Patrice L Winder
(74) *Attorney, Agent, or Firm* — Larson Newman, LLP

(57) ABSTRACT

A system for selective protection of display screen content, wherein the system may be configured to receive input data that includes sensor data from a user presence detection sensor to detect presence of at least two users within a field of view of a display screen. The system also may determine whether an application includes sensitive content is on display. In addition, the system may determine a security management action as defined by a display security policy based on the presence of the at least two users within the field of view of the display screen and determine whether the application sensitive content is on display at the display screen. In response to a determination to apply the security management action, the system may perform the security management action to protect the sensitive content at the display screen.

20 Claims, 4 Drawing Sheets

(56) References Cited

U.S. PATENT DOCUMENTS

| | | | |
|---|---|---|---|
| 2014/0201844 A1* | 7/2014 | Buck | G06F 21/554 |
| | | | 726/26 |
| 2014/0259189 A1* | 9/2014 | Ramachandran | H04L 63/123 |
| | | | 726/30 |
| 2016/0210473 A1* | 7/2016 | Cohen | G06F 21/60 |
| 2017/0040002 A1* | 2/2017 | Basson | G06F 21/84 |
| 2017/0255786 A1* | 9/2017 | Krishnamurthi | G06F 21/84 |
| 2018/0205876 A1* | 7/2018 | Paulus | H04L 9/3247 |
| 2018/0225481 A1 | 8/2018 | Hamlin et al. | |
| 2020/0225741 A1 | 7/2020 | Iyer et al. | |
| 2020/0236539 A1* | 7/2020 | Santos | G06F 21/84 |
| 2020/0349296 A1* | 11/2020 | Young | G06F 21/84 |
| 2021/0089109 A1 | 3/2021 | Iyer et al. | |
| 2021/0240493 A1 | 8/2021 | Hamlin et al. | |
| 2021/0240842 A1 | 8/2021 | Hamlin et al. | |
| 2021/0266734 A1* | 8/2021 | Kapinos | G06F 21/6245 |
| 2022/0075854 A1* | 3/2022 | Chhabra | G06F 21/84 |
| 2022/0107774 A1* | 4/2022 | Gehler | G06F 21/32 |
| 2023/0254554 A1* | 8/2023 | Hassan | H04W 12/65 |
| | | | 348/164 |

OTHER PUBLICATIONS

English translation of CN-104715213-A, retrieved from PE2E search, 7 pages. (Year: 2013).*

* cited by examiner

SELECTIVE DISPLAY INFORMATION SECURITY SYSTEM

FIELD OF THE DISCLOSURE

The present disclosure generally relates to information handling systems, and more particularly relates to a selective display information security system on multi-user presence detection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system for selective protection of display screen content, wherein the system may be configured to receive input data that includes sensor data from a user presence detection sensor to detect the presence of at least two users within a field of view of a display screen. The system also may determine whether an application includes sensitive content is on display on the display screen. In addition, the system may determine a security management action as defined by a display security policy based on the presence of at least two users within the field of view of the display screen and determine whether the application sensitive content is on display at the display screen. In response to a determination to apply the security management action based on the display security policy, the system may perform the security management action to protect the sensitive content at the display screen.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems, for example, desktop computers, laptop/notebook computers, tablet computers, mobile devices, and/or other computing systems or portable information handling systems are often used to handle sensitive information. Portable information handling systems allow a user to access work applications while mobile. While convenient, this poses security risks such as an unauthorized user viewing the sensitive information being processed by the user while working. For example, a user decides to work at a coffee shop where anyone walking nearby can view the content on the user's display. Thus, it is desirable to implement a security system and method to ensure that sensitive information cannot be viewed by unauthorized users. Accordingly, a display information security system in the present disclosure provides selective protection of display content on multi-user detection. In one embodiment, the display information security system includes a security manager service and/or an embedded controller that orchestrates security management actions in response to detection of multiple users in an information handling system's field of view. Further, the display information security system as discussed in detail below provides support for multiple display devices or display screens and is display adapter and/or display technology agnostic.

Figure 1:
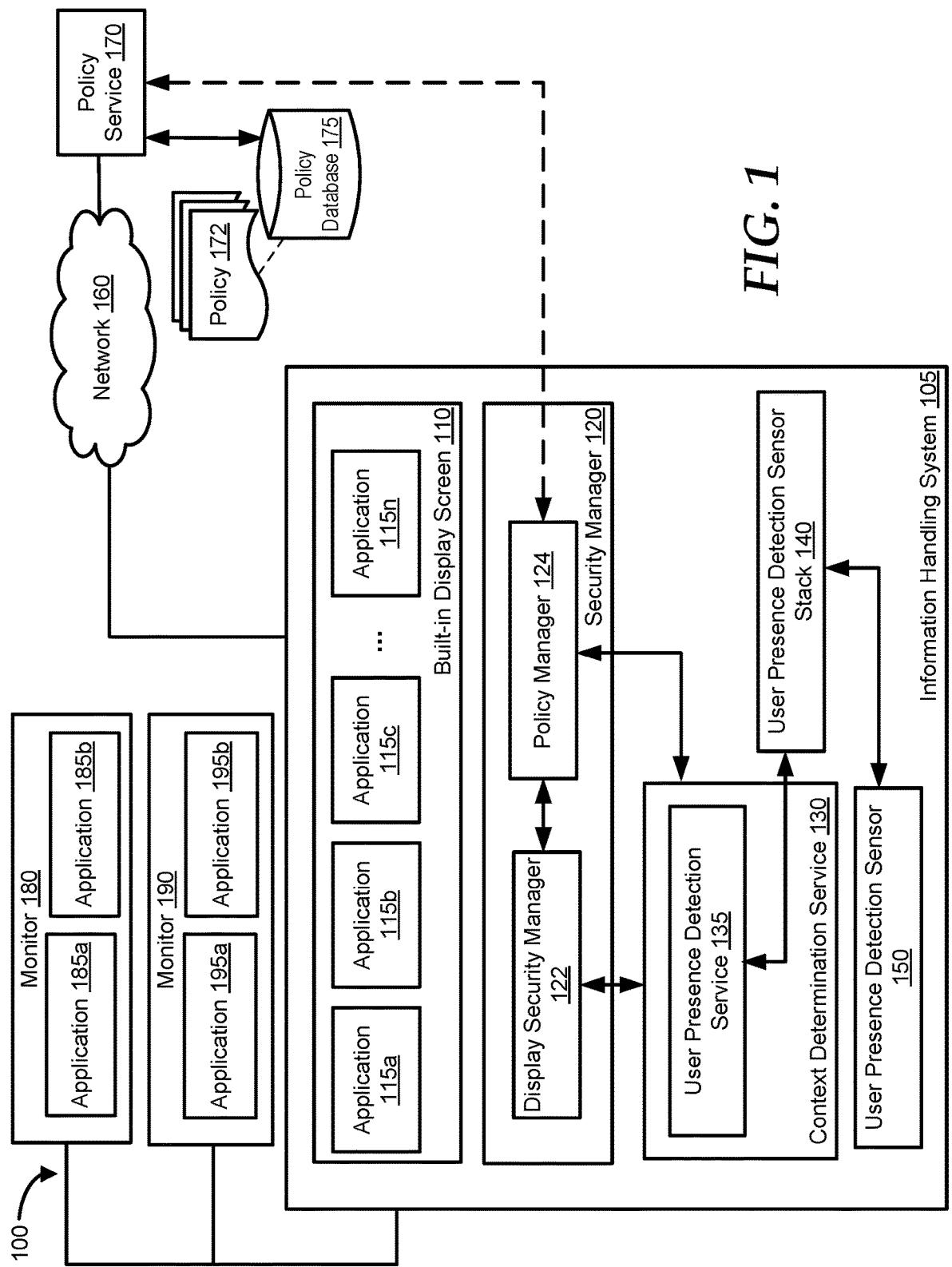
FIG. 1 is a block diagram illustrating an example of a selective display information security system on multi-user presence detection, according to an embodiment of the present disclosure.

FIG. 1 shows a display information security system 100 to selectively secure contents of a display screen from unauthorized users. The display information security system 100 prevents the unauthorized users or onlookers from viewing sensitive or confidential information by performing one or more actions to secure display screen contents based on the current state of the information handling system or its environment. For example, the display information security system 100 may obscure an application window or an entire display screen upon detection of an unauthorized user or onlooker.

The display information security system 100 includes an information handling system 105, a monitor 180, a monitor 190, and a server with a policy service 170 which is associated with a policy database 175. The information handling system 105 is communicatively coupled with the policy service 170 via a network 160. The information handling system 105 includes a security manager 120, a context determination service 130, a user presence detection (UPD) sensor stack 140, and a UPD sensor 150. The context determination service 130 includes a UPD service 135. The security manager 120 includes a display security manager 122 and a policy manager 124.

Figure 4:
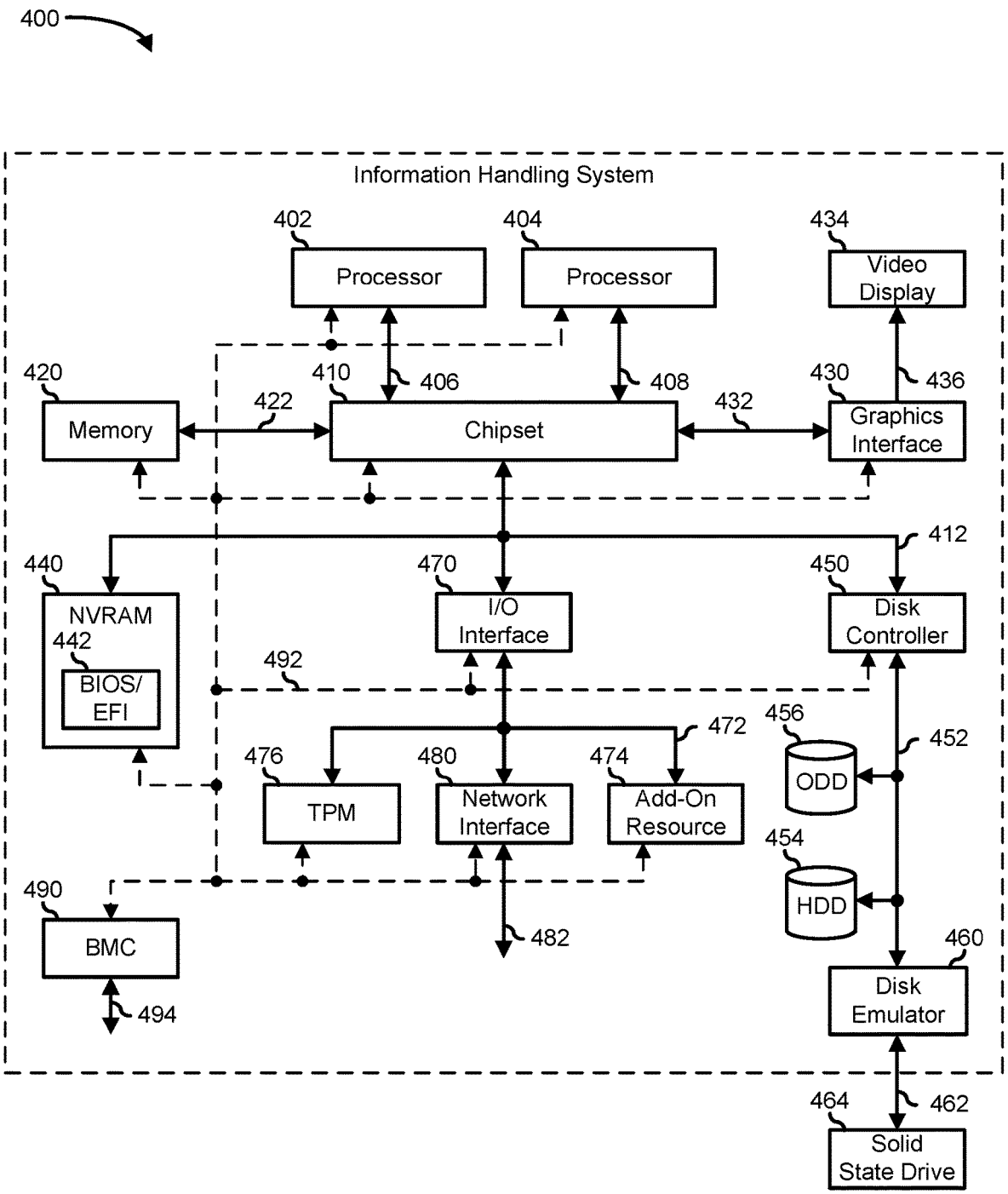
FIG. 4 is a block diagram illustrating an information handling system according to an embodiment of the present disclosure.

Information handling system 105 may include computing devices similar to information handling system 400 of FIG. 4. For example, the information handling system 105 may be a client device such as a laptop, a notebook, a desktop, a mobile device, etc. The information handling system 105 may also be a server device such as an enterprise server, an application server, an email server, a web server, a content server, an application server, etc. The information handling system 105 may include an integrated display, such as a built-in display screen 110. The built-in display screen 110 may be an organic light-emitting diode (OLED) type displays screen, a light-emitting diode (LED) display screen, a liquid crystal display (LCD), an electroluminescent display (ELD), or other types of display technologies according to various disclosures. The information handling system 105 may also support the use of an external display device such as a monitor 180, and a monitor 190, each of which includes a display screen. Although the information handling system is shown to be associated with the built-in display screen 110, the monitors 180 and 190, the information handling system 105 may be associated with more or fewer display devices than depicted. For example, the information handling system may not have a built-in screen and/or maybe associated with one or three external display devices.

Applications 115a-115n includes software programs that are configured to display information and/or video via display screen at some point in the process. The applications 115a-115n may reside locally in the information handling system 105 or hosted remotely such as at a cloud service. Examples of the applications 115a-115n include, but are not limited to, applications such as media players, web browsers, document processors, email services, etc. Applications 185a, 185b, 195a, and 195b may be similar to one of the applications 115a-115n.

The UPD sensor 150 may be one of a camera or vision-based sensors at the information handling system 105. The UPD sensor 150 may include a proximity sensor such as optical infrared and sonar sensor that may be configured to indicate a user's presence at a field of view, absence from the field of view, and/or distance from the display screen. Generally, the UPD sensor 150 emits infrared illumination in a scan pattern and detects reflections from objects to determine a distance to the objects. Although the UPD sensor 150 is shown to be included in the information handling system 105, the UPD sensor 150 may be located in one or more peripheral devices such as in the monitor 180, the monitor 190, a keyboard, a mouse, and the like. In addition, the information handling system 105 may include more than one UPD sensor. For example, in addition to the UPD sensor 150, one or more of the external display devices may include another UPD sensor.

Data generated by the UPD sensor 150 may be transmitted to the UPD sensor stack 140 for processing. The UPD sensor stack 140 may include a driver and/or software to process UPD sensor data collected and/or received by the UPD sensor stack 140. The UPD sensor stack 140 may monitor and/or communicate with the UPD sensor 150 to collect and/or receive UPD sensor data. In addition, the UPD sensor stack 140 may communicate with the UPD service 135 that processes the UPD sensor data and/or controls the UPD sensor 150. In one example, the UPD sensor stack 140 may request a driver of the UPD sensor 150 for the data continuously or according to a specified interval. In another example, the driver of the UPD sensor 150 may continuously or periodically send data to the UPD sensor stack 140 without waiting for the request. After the receipt of the UPD sensor data, the UPD sensor stack 140 may transmit the UPD information to the UPD service 135. The UPD sensor stack 140 may process the UPD information before transmission. For example, the UPD sensor stack 140 may perform calculations, batching, or the like on the UPD information before the transmission to the UPD service 135.

In another embodiment, the information handling system 105 may include other sensors such as an ambient lighting sensor. The information handling system 105 may also include other sensor stacking and software services to process the sensor data from the other sensors. For example, the information handling system 105 may include an ambient lighting sensor stack and an ambient lighting detection service. The ambient lighting sensor may transmit data to the ambient lighting sensor stack for processing which may then transmit it to the ambient lighting detection service for further processing.

The context determination service 130 may be configured to receive input data which it uses to analyze the conditions sensed by the sensors and/or other data provided from various inputs. Based on the analysis, the context determination service 130 may determine the context of the conditions under which the information handling system 105 is currently operating and/or its environment. The context determination service 130 may be configured to detect the current state of the information handling system 105 including the current state of its components, devices, and/or applications. The context determination service 130 may include a UPD service 135, a network context determination service, an ambient lighting context determination service, and the like. The context determination service 130 may be configured to collect/receive and process one or more input data such as UPD information, network change events, network information, ambient lighting data, etc. Although the context determination service is shown to be located locally at the information handling system 105, the context determination service 130 may be located remotely and be communicatively coupled to the information handling system 105 via the network 160.

Network 160 may be implemented as or maybe a part of, a storage area network (SAN), a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. The network 160 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS), or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network 160 and its various components may be implemented using hardware, software, or any combination thereof. These components may be configured to facilitate communication between the policy service 170 and the information handling system 105.

The UPD service 135 may collect and/or receive the UPD information continuously or periodically at a pre-determined frequency from one or more sensors such as the UPD sensor 150. The UPD information may include conventional keyed inputs, infrared time of the UPD sensor 150, raw distance information for detected objects, user presence and absence determinations, sensor settings like infrared frequency, infrared sensitivity, ambient light conditions, and other operating conditions of the UPD sensor 150. Based on the UPD information, the UPD service 135 may detect or determine the current state of user(s) presence such as whether an authorized user is present or absent in the field of view. The UPD service 135 may also determine the distance of the user from the information handling system 105 and/or from monitors 180 and 190. In addition, the UPD service 135 may determine whether there is a single user or multiple users, which are at least two users, present in the field of view. The UPD service 135 may process the collected and/or received UPD information to determine if there is a change to a determined state. For example, the UPD information may be used to determine whether additional users have come or left the field of view.

The network context determination service may process network events to determine the type of network the information handling system 105 is connected to. Similarly, the lighting context determination service may process ambient lighting data associated with the information handling system to determine the amount of lighting available at the built-in display screen 110, the monitor 180, and/or the monitor 190. After processing the input data, the context determination service 130 or its components such as the UPD service 135 may transmit the information to the security manager 120. In particular, the information may be transmitted to the display security manager 122 and the policy manager 124. The UPD service 135 may provide the display security manager 122 the information regarding the user presence and/or absence in the field of view of the display screens associated with the information handling system 105. In particular, the UPD service 135 may provide information on whether it detected one or more users in the field of view. In addition, the UPD service 135 may provide information on whether each one of the users detected is authorized and/or unauthorized.

The security manager 120 may run locally include a set of application or software services, such as the display security manager 122 and the policy manager 124. The security may orchestrate the performance of selective display information security system on multi-user presence detection with these software services. The security manager 120 may be configured to determine and execute one or more security management actions based on the analysis of various inputs by the context determination service 130 and display security policies. In another embodiment, the security manager 120 may be configured to be hosted remotely, such as via a cloud service.

The display security manager 122 may register with various services to receive input data. For example, the display security manager 122 may register with the UPD service 135, the UPD sensor stack 140, and/or the context determination service 130 to receive input data from the UPD service 135, the UPD sensor stack 140, and/or the context determination service 130. The input data may include multi-user detection events with metadata such as face angle, distance, etc. for each of the users detected. The display security manager 122 may receive various events or information associated with the information handling system 105 and/or its environment such as user detection events, network events, ambient light settings, status of the display and/or peripheral devices, etc. For example, the display security manager 122 may receive public network events, such as when the user has logged in a public network like an airport or coffee shop network.

The display security manager 122 may be configured to identify and/or classify application(s) at runtime when the application loads or based on other events such as when an unauthorized user or onlooker is detected or when the authorized user logs in a public network. The applications may be classified based on whether they contain sensitive information. The applications that have sensitive information may be further classified into various categories such as confidential, secret, top-secret, based on the level of sensitivity of its content. The display security manager 122 may identify these applications as defined by or based on one or more display security policies and/or classification from the application's development company. The display security manager 122 may also base the identification on a list of such applications as determined by the user and/or the information technology administrator. The list may include categories into which these applications may be classified. For example, the categories may be based on various factors such as the level of user privacy settings, whether the information is classified, etc.

The display security manager 122 may also identify and/or classify status of the application windows, display screens, images, and/or content based on the classification of the applications and/or their content. For example, even if the application is classified as top secret, but the content currently shown at the display screen is not sensitive the display screen may not be classified as top secret. The identification and/or classification may be based on independent hardware vendor (IHV) and/or independent software vendor (ISV) secure identification. The classification may also be based on user configuration, preference, or selection. The identification and/or classification may also be performed at runtime upon loading of the application or in response to the multi-user presence detection, login to a public network by an authorized user, power on of an external display device, changing the size of an application window such as to fit the display screen, etc.

The display security manager 122 may determine and execute security management actions based on display security policies which include enterprise display security policies and user display security policies. The enterprise display security policies may be enterprise wide policies that are maintained by an information technology administrator. The user display security policies are maintained by each user and may include user configurations, preferences, and/or settings. The security management actions may also be based on the input data received from the context determination service 130 or its components such as the UPD service 135. The display security manager 122 may be configured to identify the system configuration and perform security management actions on some portions or all of the information shown and/or a display screen. For example, if there are multiple users and there is sensitive information or content on display, the display security manager 122 may minimize the application window that contains the sensitive information. If there are multiple application windows with sensitive information or content, then the display security manager 122 may determine to obscure the entire display screen. In another example, even there are multiple users detected and there is sensitive information on the display screen but if the users are all authorized, the display security manager 122 may determine not to obscure the sensitive information. If there are multiple display screens associated with the information handling system 105, then the display security manager 122 may determine to obscure an application window in one of the display screens, obscure the other display screen while another display screen appears normal.

The display security manager 122 may be configured to determine display screen real estate available for its disposal. Accordingly, the display security manager 122 may determine information regarding display devices and/or display screens associated with the information handling system 105 such as the number of active display devices and/or display screens. The display security manager 122 may determine other information associated with each of the display devices or display screens such as the size of the display screen, the position, and orientation, the status such as whether the display screen is active or inactive, whether any security management actions are enabled on the display devices and/or the display screens, etc. The display security manager 122 may determine the application windows currently open and information associated with those application windows, such as the application and its category or type.

The display security manager 122 may communicate with the policy manager 124, wherein the display security manager 122 may be configured to perform the orchestration in selectively determining whether to perform a security management action such as to obscure an application window or an entire display screen. For example, the display security manager 122 may be configured to determine whether to apply, update, or reverse a security management action or configuration setting to one or more application windows and/or display device. The policy manager 124 may be configured to manage display security policies such as to retrieve and/or update enterprise display security policies and/or user-defined display security policies. The policy manager 124 may be configured to provide display security policies to the display security manager 122 and/or override configuration and/or operations associated with the display security settings of information handling system 105. The policy manager 124 may have a user interface that allows the user such as the information technology administrator, to update, select, or modify the display security policies.

The display security manager 122 may be configured to determine one or more security management actions that may be applied and whether to apply the one or more security management actions based on analysis of the input data, the available display screen real estate, and the display security policies. If it is determined to apply at least one of the security management actions, then the display security manager 122 may also determine when, where, and/or how to apply the security management actions. For example, the display security manager 122 may be configured to select whether to apply the security management action to an application window, a display screen, or a portion thereof. The security management actions include obscuring or blurring the sensitive, classified, or confidential information displayed onscreen. The management actions also include minimizing an application window, enabling a privacy guard, adjusting the brightness level of a display screen, limiting the viewing angle of a display screen, and the like. The display security manager 122 may determine whether to obscure a particular application window, a portion of the application window, or the entire display screen. If it is determined that the application window of the particular application or a portion of the application window is to be obscured, then the other application windows or other portions of the application window may appear normal. For example, the display security manager 122 may determine to obscure half of the application window, display screen, or contents of the application window while retaining the other half in its normal state.

The display security manager 122 may also determine at what level to apply the security management action if applicable. The display security manager 122 may apply different obscuring levels when obscuring one or more application windows and/or display screens, wherein a level of obscuring is based on sensitivity level of the sensitive content displayed. The display security manager 122 may obscure the application window/contents on a gradient grayscale fashion such as having sections of the application window or the display screen such as the sides and/or angles where the unauthorized user is detected. The obscuring at the sides, bottom, and top of the application window or portions thereof may be heavier compared to the other sections. The heavier obscuring may be applied at an angle based on the location of a particular user that is deemed unauthorized.

In another example, the display security manager 122 may obscure the entire display screen when it determines that there is no authorized user within the field of view. The display security manager 122 may revert the obscuring of the display screen when it detects that the authorized user is back and that there are no unauthorized users within the field of view. The display security manager 122 may also determine whether to apply other display security management actions, such as muting speakers, turning off the camera, turning off print screen function, etc. based on other factors such as upon detecting a public network connection. In yet another example, the security management action may include adjusting the brightness of the pixels based on an ambient light level, wherein the adjustment is to decrease the legibility of the content or images on the display device for the unauthorized user. The security management action may also dim the entire display screen instead.

The display security manager 122 may determine whether the security management action may be applied for a predetermined time period. For example, the display security manager 122 may obscure the application window or display screen for an hour when it determines that there is an hour-long meeting scheduled in the calendar of the authorized user. However, the authorized user may override the security management action, such as by closing the application with the sensitive data or hitting an override button. The display security manager 122 may also temporarily remove the security management action based on an event or a user action. For example, the obscuring of an application window or display screen may be temporarily reverted or cleared when the authorized user hovers over the obscured application window/content or a display screen with a mouse, joystick, or similar. The security management action may also be temporarily reverted or removed when it is detected that the authorized user has been staring at the obscured application window or display screen for a specific duration, if it is detected that the unauthorized user is no longer present, or upon completion of the duration of the security management action.

The display security manager 122 may further provide notification to the user and/or the information technology administrator regarding the security management actions and/or configuration settings. The notification may also include an ability for the user and/or the administrator to modify the security management actions and/or configuration settings. For example, the user and/or administrator may choose to close the application window, delete a cookie, remove the obscuring of a particular application window, obscure another application window/content/screen, turn on an electronic privacy screen if available, disable print function, disable capture screen function, override a configuration setting, etc. The user may also re-classify the application, such as de-classify the application which removes the security management action applied to the application window and/or display screen associated with the application. The notification may be provided before or after the display security mitigation.

Policy service 170 is configured to define and store enterprise display security policies at the policy database 175, while the user display security policies may be stored locally. In another embodiment, both the enterprise display security policies and the user display security policies may be stored in at the policy database 175. The policy service 170 may be configured to allow for a selective display information security protection via consumption of one or more of the display security policies. One or more of the display security policies stored in the policy database 175 may be transmitted to the policy manager 124 and/or received from policy manager 124. For example, a particular display security policy may be transmitted to the policy service 170 by the policy manager 124 after the policy 172 has been created and/or updated. The policy service 170 may then store the particular display security policy in the policy database 175. The policy database 175 may be configured to store display security policies, such as policy 172 that includes enterprise display security policies that are generated, defined, and/or otherwise provided by the information technology administrator. The display security policies may also include user display security policies that are generated, defined, and/or otherwise provided by an authorized user of the information handling system 105.

Policy 172 may include different parameters that define display security mechanisms and/or application and its categories. The parameters may be associated with the detection of the presence of multiple users in the field of view. The policy 172 may include one or more of the following: a list of applications managed by the display security manager 122, application categories, security management actions that are allowed or disallowed, levels of each of the security management actions to be applied, duration of the security management actions if applicable, etc. For example, the security management action may be applied on a portion of or the entire application window and/or display screen. The policy 172 may also include information on whether the security management action may be allowed to be reverted based on a particular action or event and whether the reversion is temporary or permanent.

Figure 2:
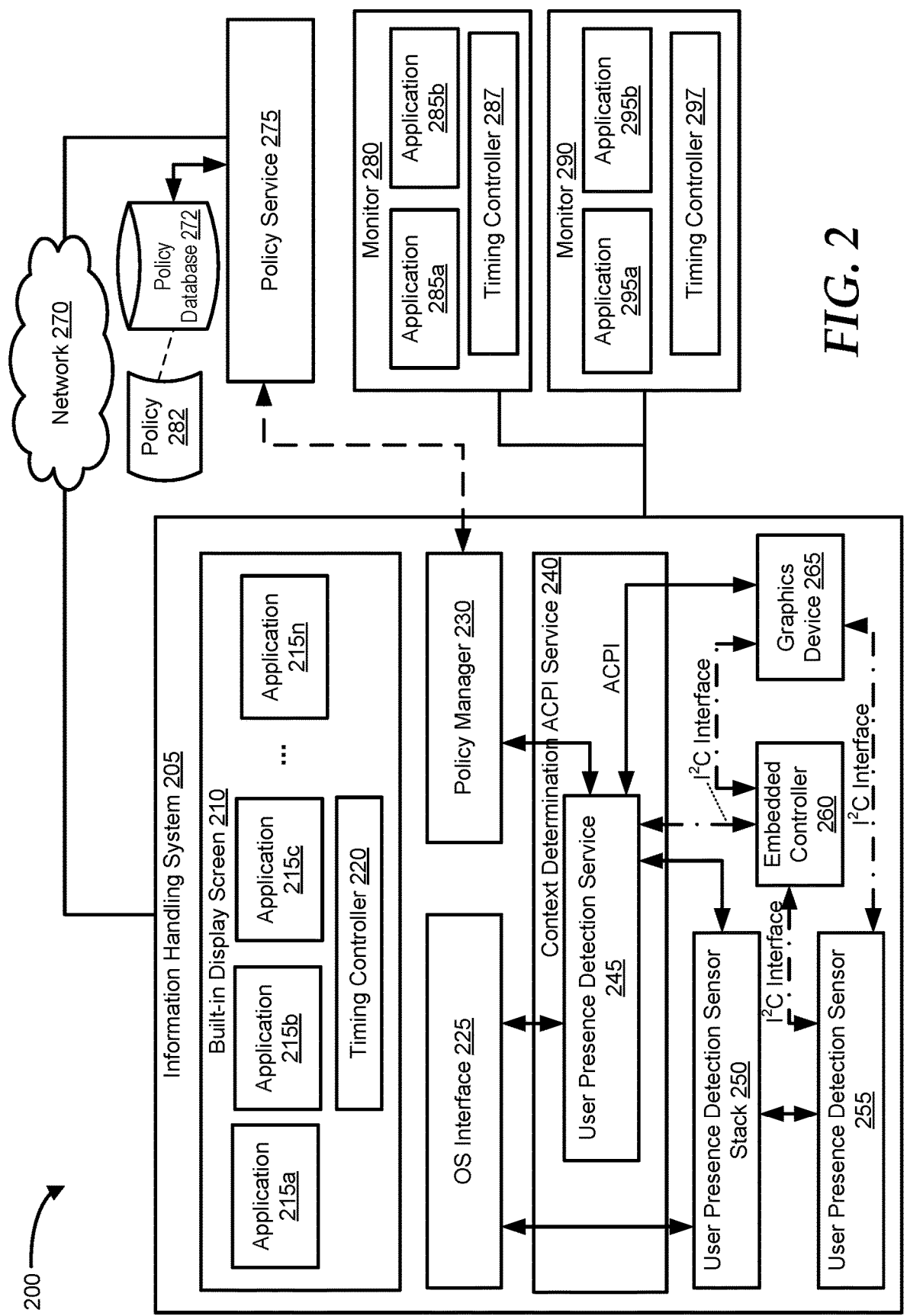
FIG. 2 is a block diagram illustrating an example of a selective display information security system on multi-user presence detection, according to an embodiment of the present disclosure.

FIG. 2 shows a display information security system 200 to selectively secure contents of a display screen from unauthorized users. The display information security system 200, which is similar to display information security system 100 of FIG. 1, includes an information handling system 205, a monitor 280, a monitor 290, and a server with a policy service 275 which is associated with a policy database 272. The information handling system 205, which is similar to information handling system 105 of FIG. 1, includes a built-in display screen 210, an operating system (OS) interface 225, a policy manager 230, a context determination advanced configuration and power interface (ACPI) service 240, a policy manager 230, a UPD sensor stack 250, a UPD sensor 255, an embedded controller 260, and a graphics device 265, which may be a graphics processor. The built-in display screen includes applications 215a-215n and a timing controller 220. The context determination ACPI service 240 includes a UPD service 245. The monitor 280 includes applications 285a-285b and a timing controller 287. The monitor 290 includes applications 295a-295b and a timing controller 297.

Various components of the display information security system 200 perform similar functions with components of display information security system 100 of FIG. 1. For example, the UPD sensor 255 is similar to UPD sensor 150 while UPD sensor stack 250 is similar to UPD sensor stack 140. In addition, the built-in display screen 210 is similar to the built-in display screen 110 while the monitors 280 and 290 are similar to the monitors 180 and 190 respectively. Also, the policy service 275 is similar to the policy service 170 while the policy database 272 is similar to the policy database 175. Further, policy 282 is similar to policy 172, while network 270 is similar to the network 160. Likewise, the applications 215a-215n are similar to the applications 115a-115n and the applications 285a and 285b are similar to the applications 185a and 185b. Conversely, the applications 295a and 295b are similar to the application 195a and 195b. In the same fashion, the policy manager 230 is similar to the policy manager 124. However, instead of communicating with the display security manager 122 the policy manager 230 may communicate with the embedded controller 260 which performs the orchestration in selectively determining whether to perform a security management action to protect sensitive display contents similar to the display security manager 122.

The UPD sensor 255, the embedded controller 260, the graphics device 265, the UPD service 245, and the context determination ACPI service 240 are connected by a serial communication bus such as an inter-integrated circuit ($I^2C$) communication bus or interface for providing side-band management and control. The $I^2C$ interface allows these devices to perform hardware to hardware communications without an OS service. For example, the context determination ACPI service may use the ACPI control method to manage and control various hardware components or devices such as display screens, monitors, graphics device 265 via the embedded controller 260. An ACPI control method may be used to implement a security management action. For example, a control method that modifies the blur, brightness, refresh rate, etc. of a display screen may be transmitted to the embedded controller 260.

The context determination ACPI service 240 may perform functions similar to the context determination service 130 of FIG. 1 such as processing input data from various sources to determine the context of the conditions under which the information handling system 205 is currently operating and/or its environment. For example, the context determination ACPI service 240 may be configured to process UPD information from the UPD sensor stack 250. In addition, the context determination ACPI service 240 may be configured to process network events and/or ambient lighting data from other sensor stacks in the information handling system 205. Based on the input data, the context determination ACPI service 240 may determine one or more of the following: whether there are multiple users present in the field of view, the type of network that the user is connected to, the amount of ambient lighting, etc. However, the context determination ACPI service 240 is an ACPI service that is communicatively coupled with the OS interface 225 for controlling the power management and configuration of various ACPI compatible devices such as the timing controller 220, the timing controller 287, and the timing controller 297 via the embedded controller 260 and/or the graphics device 265.

Because the UPD service 245 runs in an operating system context, it can consume data from the operating system for transmission to other devices such as the embedded controller 260 for orchestration of performing instructions such as associated with a security management action with various devices and/or components of the information handling system 205 such as the graphics device 265, the UPD sensor 255, and the timing controllers 220, 287, and 297. The embedded controller 260 interrogates and receives notifications, evaluates UPD determinations, and provides context to the OS such as through the OS interface 225 which may be a Windows® Management Interface (WMI), Microsoft® Core Services, host embedded controller interface (HECI), etc. that subscribe through the embedded controller through the I²C interface or similar.

For example, the embedded controller 260 may transmit and/or receive data from the UPD sensor 255. The embedded controller 260 may also receive instructions from the UPD service 245, such as to transmit a signal to the graphics device 265 for obscuring an application window or display screen. In another example, the embedded controller 260 may collect UPD sensor data from the UPD sensor 255 based on an instruction from the UPD service 245. The embedded controller 260 may also transmit an instruction to the UPD sensor 255 to transmit sensor data to the graphics device 265, wherein if the sensor data reaches a certain threshold then the graphics device 265 may perform a security management action, such as dim a display screen. In line with this, the embedded controller 260 may also perform OS managed operations associated with the aforementioned devices and/or components such as turning off the display screens of the built-in display screen 210, monitors 280, and monitor 290. Accordingly, the embedded controller 260 is in communications with and configured to receive data from or transmit data to UPD sensor 255, graphics device 265, and the UPD service 245 via I²C interfaces.

The embedded controller 260 may perform functions similar to the functions of the display security manager 122 of FIG. 1. The embedded controller 260 may collect and/or receive information associated with the current state of the information handling system from the context determination ACPI service 240 via an ACPI interface. For example, the embedded controller 260 may be configured to receive input data such as from the UPD service 245. The embedded controller 260 may also receive various events or information such as user detection events, network events, ambient light settings, the current status of the display devices and/or peripheral devices, etc. from one or more sensors such as the UPD sensor 255. In an example, the embedded controller 260 may receive an ambient light level from an ambient light sensor.

These events or information have been aggregated by the OS interface 225 and advertised to the context determination ACPI service 240 for transmission to the embedded controller 260. In addition, the embedded controller 260 may be configured to identify an application(s) that handle sensitive information. The embedded controller 260 may also be configured to determine display screen real estate available for its disposal. The embedded controller 260 may determine and execute security management actions based on display security policies which include enterprise display security policies and user display security policies that include user configurations, preferences, and/or settings. Because the embedded controller 260 orchestrates or coordinates the selective performance of security management, the display information security system 200 is device agnostic.

The graphics device 265 may be configured to receive one or more instructions from the context determination ACPI service 240 based on processed information from UPD service 245 via an ACPI interface. The graphics device 265 is also communicatively coupled to the embedded controller 260 via an I²C interface which allows the embedded controller 260 to transmit data to modify graphics stream directly. The graphics device 265 may also have direct hardware to hardware connection with UPD sensor 255 via an I²C interface or similar. The connection allows for graphics status indicators, such as refresh rate setting, brightness values, graphics subsystem embedded privacy configurations, etc. to be transmitted by the graphics device 265 to the UPD sensor 255 directly which may free up some processing time for the embedded controller 260.

The graphics device 265 may perform one or more security management actions according to the received instructions from the context determination ACPI service 240 and the embedded controller 260. For example, the graphics device 265 may send display data to a timing controller. For example, the graphics device 265 may send display data to the timing controller 220, wherein the timing controller 220 separates the display data into input signals such as image data and control signals, and wherein the control signals include signals associated with the security management action. The timing controller 220 may then pass the image data and control signals to one or more drivers of the built-in display screen 210 to control the pixel array. In this example, the control signal may be to obscure the application window of the application 215b and allow the other application windows such as the application 215a and the application 215c to be viewed normally. In another example, another control signal may be sent to the timing controller 297 to obscure the entire display screen. In yet another example, the embedded controller 260 may provide a signal to the graphics device 265 and/or the timing controller to adjust the brightness of the pixels of the display screen to reduce the legibility of the content or images shown, such as to decrease the brightness of the pixel to a suitable level below the ambient brightness level. The adjustment may be performed on the pixels within the field of view of the unauthorized user.

The OS interface 225 may be an OS application that may be configured to transmit and receive data from the embedded controller 260 to the operating system, wherein the data may be used to determine the current state of the information handling system 205 and associated peripheral and/or display devices. The state information may be collected via ACPI methods through the context determination ACPI service 240. The OS interface may perform aggregation and/or advertise the data to the context determination ACPI service 240 which are then transmitted to and/or collected by the embedded controller 260.

In various embodiments, the display information security system 100 and the display information security system 200 may not include each of the components shown in FIG. 1 and FIG. 2 respectively. Additionally, or alternatively, the display information security systems may include other components in addition to those that are shown in FIG. 1 and FIG. 2. Furthermore, some components that are represented as separate components in FIG. 1 and FIG. 2 may be integrated with other components in certain embodiments. For example, in certain embodiments, all or a portion of the functionality provided by the illustrated components may instead be provided by components integrated into one or more processor(s) as a system-on-a-chip.

Figure 3:
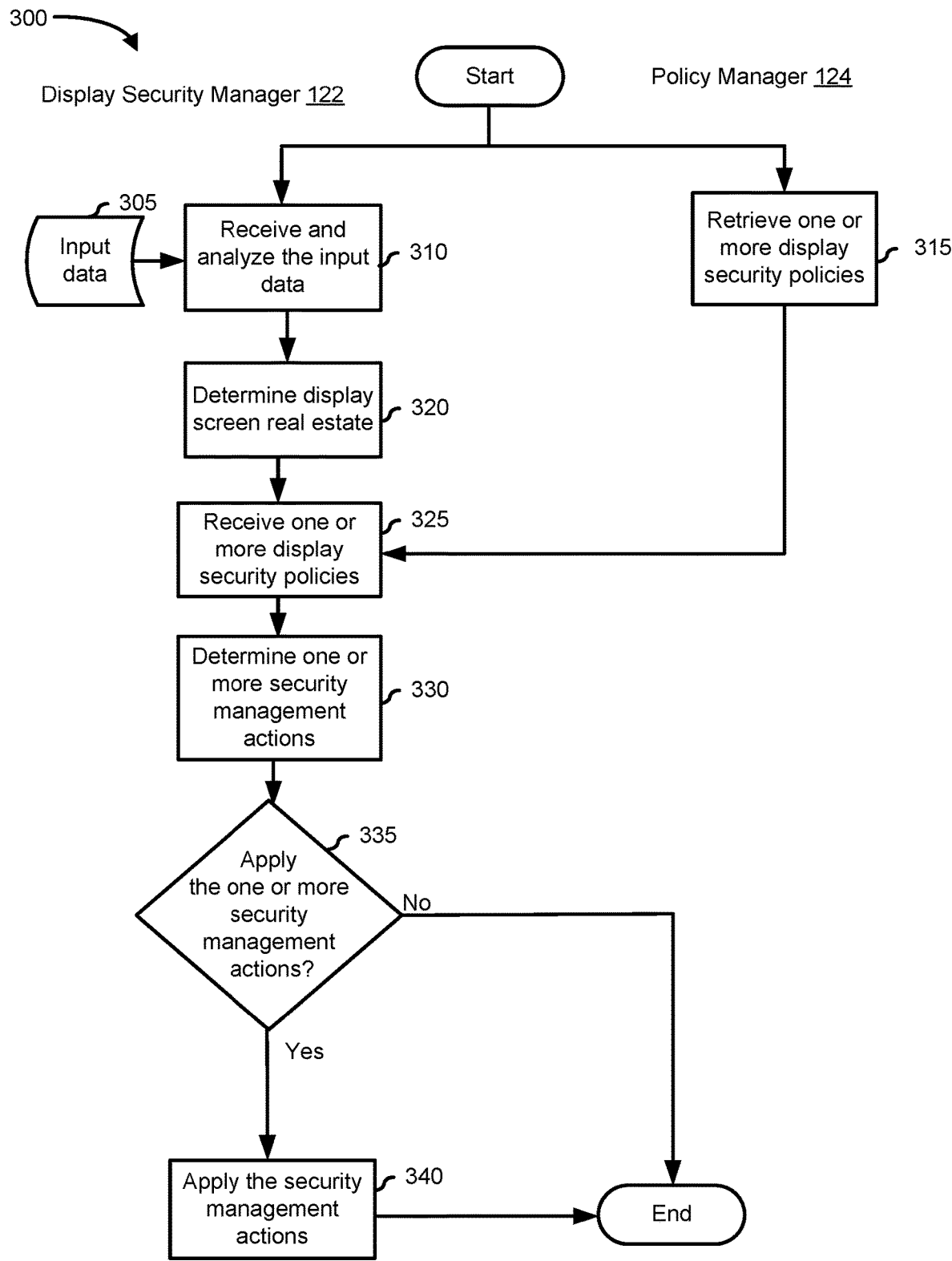
FIG. 3 is a flowchart illustrating an example of a method for selective display information security system on multi-user presence detection, according to an embodiment of the present disclosure.

FIG. 3 is a flowchart illustrating an example of method 300 for selectively determining whether to apply a security management action. Method 300 typically starts at block 310 and/or at block 315. At block 315, the policy manager 124 may retrieve one or more display security policies from a policy service. The display security policies may be defined for a situation in which an unauthorized user has been detected to have viewing access to sensitive information on a display screen. The policy manager 124 may cache the display security policies for collection by the display security manager 122. In another embodiment, the policy manager 124 may publish the display security policies for the display security manager 122.

At block 310, the display security manager 122 receives input data 305. The display security manager 122 may be configured to collect the input data 305. In another embodiment, the input data 305 may be advertised by one or more components of an information handling system. In addition, the display security manager 122 may register with one or more sensors or components to receive their information. For example, the display security manager 122 may register with the UPD sensor to receive and/or collect user presence sensor data. While embodiments of the present disclosure are described in terms of the display information security system of FIG. 1, it should be recognized that other systems may be utilized to perform the described method. For example, the embedded controller 260 of FIG. 2 may perform functions of the display security manager 122.

The input data 305 may include data from one or more sensors such as a UPD sensor. The input data may also include network events, ambient lighting, configuration information such as default, generated, and/or user-defined configuration settings. The input data may also include user display security policies. At block 320, the display security manager 122 may determine the current status of the display screen real estate. The display security manager 122 may determine the status of application windows and of the display screens that may be built-in or external to the information handling systems. In one embodiment, the display security manager 122 may determine whether an application sensitive content is on display at the display screen. At block 325, the display security manager 122 may collect or receive one or more display security policies from the policy manager 124.

At block 330, the display security manager 122 analyzes the input data and the current status of the display screen real estate to determine one or more security management actions that may be applicable based on the one or more display security policies. The determination may be based on various factors such as the number of users within a certain distance to a display screen, the angle of the faces of the users, the category of the application window, etc. In one embodiment, the display security manager 122 may determine a security management action as defined by a display security policy based on the presence of the at least two users within the field of view of the display screen and determining that the application includes sensitive content. The security management action includes obscuring an application window of a plurality of application windows associated with the application, wherein the application window includes the sensitive content. The determination of the security management action is further based on current context of conditions under which an information handling system is currently operating.

At decision block 335, the display security manager 122 determines whether to apply one or more security management actions. The display security manager 122 may perform the determination based on the analysis at block 330. The display security manager 122 may also determine whether to apply one or more security management actions based on the display security policies. For example, the display security manager 122 may analyze input data that includes multi-user metadata, network event, ambient lighting data, etc. The display security manager 122 may also determine whether one or more of the currently active application windows have sensitive or confidential information. A notification may also be sent to an authorized user who may decide not to apply the security management action.

If the display security manager 122 determines to apply one or more security management actions, then the "YES" branch is taken and the method proceeds to block 340. If the display security manager 122 determines not to apply one or more security management actions then the "NO" branch is taken and the method ends. At block 340, the display security manager 122 may apply one or more security management actions. For example, the display security manager 122 may select to obscure an application window with sensitive information, wherein the application window is within a field of view of an unauthorized user, while other application windows appear normally and display screens. The display security manager 122 may also select obscure an entire display screen associated with the application window while the other display screens appear normally. The display security manager 122 may perform the selective obscuring or protection of the sensitive content based on the face angle of an unauthorized user, environment context, and/or a display security policy. The display security manager 122 may stop the obscuring when the unauthorized user or onlookers moves away from the field of view of the sensitive content.

The security management action includes but is not limited to the obscuring or blurring of the application windows, the content of the application windows, display screens, or portions thereof. For example, the security management action may include turning on an "e-privacy" screen if the display screen supports the feature. The security management actions may also include muting the system speakers, turning off the camera or printer function when detecting a public network connection. The security management actions may also include sending notifications to an authorized user and/or an information technology administrator that includes information regarding the current state of the information handling system and its environment. For example, the notification may include whether the information handling system is in a public or corporate network, whether an unauthorized user is detected. The notification may also include options such as whether to close or minimize the application window, delete a cookie, and the like. The security management action applied may be based on the sensitivity of the information to be displayed, the presence and/or location of the unauthorized user, and/or any other factor. Although the display security manager 122 is shown to perform blocks 310, 320, 325, 330, and 340 with decision block 335, an embedded controller may be configured to perform the aforementioned blocks and orchestrate selective protection of the content of an application shown at a display screen.

FIG. 4 illustrates an embodiment of an information handling system 400 including processors 402 and 404, a chipset 410, a memory 420, a graphics adapter 430 connected to a video display 434, a non-volatile RAM (NV-RAM) 440 that includes a basic input and output system/extensible firmware interface (BIOS/EFI) module 442, a disk controller 450, a hard disk drive (HDD) 454, an optical disk drive 456, a disk emulator 460 connected to a solid-state drive (SSD) 464, an input/output (I/O) interface 470 connected to an add-on resource 474 and a trusted platform module (TPM) 476, a network interface 480, and a baseboard management controller (BMC) 490. Processor 402 is connected to chipset 410 via processor interface 606, and processor 404 is connected to the chipset via processor interface 408. In a particular embodiment, processors 402 and 404 are connected together via a high-capacity coherent fabric, such as a HyperTransport link, a QuickPath Interconnect, or the like. Chipset 410 represents an integrated circuit or group of integrated circuits that manage the data flow between processors 402 and 404 and the other elements of information handling system 400. In a particular embodiment, chipset 410 represents a pair of integrated circuits, such as a northbridge component and a southbridge component. In another embodiment, some or all of the functions and features of chipset 410 are integrated with one or more of processors 402 and 404.

Memory 420 is connected to chipset 410 via a memory interface 422. An example of memory interface 422 includes a Double Data Rate (DDR) memory channel and memory 420 represents one or more DDR Dual In-Line Memory Modules (DIMMs). In a particular embodiment, memory interface 422 represents two or more DDR channels. In another embodiment, one or more of processors 402 and 404 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 420 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 430 is connected to chipset 410 via a graphics interface 432 and provides a video display output 436 to a video display 434. An example of a graphics interface 432 includes a Peripheral Component Interconnect-Express (PCIe) interface and graphics adapter 430 can include a four-lane (×4) PCIe adapter, an eight-lane (×8) PCIe adapter, a 16-lane (×16) PCIe adapter, or another configuration, as needed or desired. In a particular embodiment, graphics adapter 430 is provided down on a system printed circuit board (PCB). Video display output 436 can include a Digital Video Interface (DVI), a High-Definition Multimedia Interface (HDMI), a DisplayPort interface, or the like, and video display 434 can include a monitor, a smart television, an embedded display such as a laptop computer display, or the like.

NV-RAM 440, disk controller 450, and I/O interface 470 are connected to chipset 410 via an I/O channel 412. An example of I/O channel 412 includes one or more point-to-point PCIe links between chipset 410 and each of NV-RAM 440, disk controller 450, and I/O interface 470. Chipset 410 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 440 includes BIOS/EFI module 442 that stores machine-executable code (BIOS/EFI code) that operates to detect the resources of information handling system 400, to provide drivers for the resources, to initialize the resources, and to provide common access mechanisms for the resources. The functions and features of BIOS/EFI module 442 will be further described below.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an institute of electrical and electronics engineers (IEEE) 1394 (Firewire) interface, a proprietary interface, or a combination thereof. Alternatively, SSD 464 can be disposed within information handling system 400.

I/O interface 470 includes a peripheral interface 472 that connects the I/O interface to add-on resource 474, to TPM 476, and to network interface 480. Peripheral interface 472 can be the same type of interface as I/O channel 412 or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral interface 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a network communication device disposed within information handling system 400, on a main circuit board of the information handling system, integrated onto another component such as chipset 410, in another suitable location, or a combination thereof. Network interface 480 includes a network channel 482 that provides an interface to devices that are external to information handling system 400. In a particular embodiment, network channel 482 is of a different type than peripheral interface 472, and network interface 480 translates information from a format suitable to the peripheral channel to a format suitable to external devices.

In a particular embodiment, network interface 480 includes a NIC or host bus adapter (HBA), and an example of network channel 482 includes an InfiniBand channel, a Fibre Channel, a Gigabit Ethernet channel, a proprietary channel architecture, or a combination thereof. In another embodiment, network interface 480 includes a wireless communication interface, and network channel 482 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 482 can be connected to an external network resource (not illustrated). The network resource can include another information handling system, a data storage system, another network, a grid management system, another suitable resource, or a combination thereof.

BMC 490 is connected to multiple elements of information handling system 400 via one or more management interface 492 to provide out-of-band monitoring, maintenance, and control of the elements of the information handling system. As such, BMC 490 represents a processing device different from processor 402 and processor 404, which provides various management functions for information handling system 400. For example, BMC 490 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 490 can vary considerably based on the type of information handling system. BMC 490 can operate in accordance with an Intelligent Platform Management Interface (IPMI). Examples of BMC 490 include an Integrated Dell® Remote Access Controller (iDRAC).

Management interface 492 represents one or more out-of-band communication interfaces between BMC 490 and the elements of information handling system 400, and can include an Inter-Integrated Circuit (I²C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 400, that is apart from the execution of code by processors 402 and 404 and procedures that are implemented on the information handling system in response to the executed code.

BMC 490 operates to monitor and maintain system firmware, such as code stored in BIOS/EFI module 442, option ROMs for graphics adapter 430, disk controller 450, add-on resource 474, network interface 480, or other elements of information handling system 400, as needed or desired. In particular, BMC 490 includes a network interface 494 that can be connected to a remote management system to receive firmware updates, as needed or desired. Here, BMC 490 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 490 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 490, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 490 is included on a main circuit board (such as a baseboard, a motherboard, or any combination thereof) of information handling system 400 or is integrated onto another element of the information handling system such as chipset 410, or another suitable element, as needed or desired. As such, BMC 490 can be part of an integrated circuit or a chipset within information handling system 400. An example of BMC 490 includes an iDRAC or the like. BMC 490 may operate on a separate power plane from other resources in information handling system 400. Thus BMC 490 can communicate with the management system via network interface 494 while the resources of information handling system 400 are powered off. Here, information can be sent from the management system to BMC 490 and the information can be stored in a RAM or NV-RAM associated with the BMC. Information stored in the RAM may be lost after power-down of the power plane for BMC 490, while information stored in the NV-RAM may be saved through a power-down/power-up cycle of the power plane for the BMC.

Information handling system 400 can include additional components and additional busses, not shown for clarity. For example, information handling system 400 can include multiple processor cores, audio devices, and the like. While a particular arrangement of bus technologies and interconnections is illustrated for the purpose of example, one of skill will appreciate that the techniques disclosed herein are applicable to other system architectures. Information handling system 400 can include multiple central processing units (CPUs) and redundant bus controllers. One or more components can be integrated together. Information handling system 400 can include additional buses and bus protocols, for example, I²C and the like. Additional components of information handling system 400 can include one or more storage devices that can store machine-executable code, one or more communications ports for communicating with external devices, and various input and output (I/O) devices, such as a keyboard, a mouse, and a video display.

For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 400 can include processing resources for executing machine-executable code, such as processor 402, a programmable logic array (PLA), an embedded device such as a System-on-a-Chip (SoC), or other control logic hardware. Information handling system 400 can also include one or more computer-readable media for storing machine-executable code, such as software or data.

Although FIG. 3 show example blocks of method 300 400 in some implementation, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel. For example, block 310 and block 320 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or another such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A system for selective protection of display screen content, the system comprising:
a processor operable to execute program instructions; and
a memory coupled to the processor, the memory having the program instructions stored thereon that upon execution by the processor cause the system to:
receive input data that includes sensor data from a user presence detection sensor to detect presence of an unauthorized user in addition to an authorized user within a field of view of a display screen;
determine whether an application includes sensitive content is on display at the display screen;
determine one or more security management actions as defined by a display security policy based on the presence of the unauthorized user in addition to the authorized user within the field of view of the display screen and determining that the sensitive content of the application is on display at the display screen;
in response to a determination to apply the one or more security management actions based on the display security policy, perform the one or more security management actions to provide protection for the sensitive content at the display screen by obscuring an application window of a plurality of application windows associated with the sensitive content of the application and limiting a viewing angle of the display screen, wherein another application window of the application windows without the sensitive content is unobscured; and
revert the one or more security management actions in response to detecting that the unauthorized user is away from the field of view of the display screen.

2. The system of claim 1, wherein the processor is further configured to determine whether the application includes the sensitive content is further based on user configuration.

3. The system of claim 1, wherein the processor transmits control signal to a timing controller to obscure the sensitive content.

4. The system of claim 1, wherein the processor is further configured to mute a system speaker in response to detecting a public network.

5. The system of claim 1, wherein the determination of the one or more security management actions is further based on current context of conditions under which an information handling system is currently operating.

6. The system of claim 1, wherein the one or more security management actions includes adjusting brightness of pixels of the display screen.

7. The system of claim 1, wherein the one or more security management actions includes obscuring the display screen of a plurality of display screens.

8. A method comprising:
receiving, by a processor, input data that includes sensor data from a user presence detection sensor to detect presence of an unauthorized user in addition to an authorized user within a field of view of a display screen;
determining whether an application that is on display at the display screen includes sensitive content;
in response to detecting the presence of the unauthorized user in addition to the authorized user within the field of view of the display screen and determining that the application that is on display includes the sensitive content, determining one or more security management actions as defined by a display security policy;
in response to determining to apply the one or more security management actions as defined by the display security policy, performing the one or more security management actions to protect the sensitive content at the display screen from the unauthorized user by obscuring an application window of a plurality of application windows associated with the sensitive content of the application and limiting a viewing angle of the display screen, wherein another application window of the application windows without the sensitive content is unobscured; and
reverting the one or more security management actions in response to detecting that the unauthorized user is away from the field of view of the display screen.

9. The method of claim 8, further comprising analyzing metadata associated with the sensor data, wherein the metadata includes face angles and distances of the unauthorized user and the authorized user from the display screen.

10. The method of claim 8, wherein the one or more security management actions includes adjusting brightness of pixels of the display screen.

11. The method of claim 8, wherein the one or more security management actions includes obscuring the display screen with the sensitive content.

12. The method of claim 8, wherein the input data includes network information.

13. The method of claim 8, wherein the input data includes ambient lighting information.

14. The method of claim 8, wherein the input data includes user configuration settings.

15. The method of claim 8, wherein a level of obscuring is based on a sensitivity level of the sensitive content for display.

16. The method of claim 8, wherein obscuring of the application window is performed for a specific duration, and wherein another application window in the display screen is not obscured.

17. One or more non-transitory computer-readable media to store instructions that are executable by one or more processors to perform operations comprising:
receiving, by a processor, input data that includes sensor data from a user presence detection sensor to detect presence an unauthorized user in addition to an authorized user within a field of view of a display screen;
determining whether an application that is on display at the display screen includes sensitive content;
in response to detecting the presence of the unauthorized user in addition to the authorized user within the field of view of the display screen and determining that the application includes the sensitive content, determining one or more security management actions as defined by a display security policy;
in response to determining to apply the one or more security management actions as defined by the display security policy, performing the one or more security management actions to protect the sensitive content at the display screen from the unauthorized user by obscuring an application window of a plurality of application windows associated with the sensitive content of the application and limiting a viewing angle of the display screen, wherein another application window of the application windows without the sensitive content is unobscured; and
reverting the one or more security management actions in response to detecting that the unauthorized user is away from the field of view of the display screen.

18. The one or more non-transitory computer-readable media of claim 17, further comprising transmitting a signal to a graphics device to obscure the display screen.

19. The one or more non-transitory computer-readable media of claim 18, wherein upon receipt of the signal, the graphics device transmitting display data to a timing controller that includes a control signal that directs the timing controller to obscure the display screen.

20. The one or more non-transitory computer-readable media of claim 17, wherein the one or more security management actions includes obscuring the display screen of a plurality of display screens.

* * * * *